(12) United States Patent
Ghim et al.

(10) Patent No.: US 11,243,070 B2
(45) Date of Patent: Feb. 8, 2022

(54) APPARATUS AND METHOD FOR MULTILAYER THIN FILM THICKNESS MEASUREMENT USING SINGLE-SHOT ANGLE-RESOLVED SPECTRAL REFLECTOMETRY

(71) Applicant: KOREA RESEARCH INSTITUTE OF STANDARDS AND SCIENCE, Daejeon (KR)

(72) Inventors: Young-Sik Ghim, Sejong (KR); Hyug-gyo Rhee, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days.

(21) Appl. No.: 16/957,801

(22) PCT Filed: Feb. 27, 2020

(86) PCT No.: PCT/KR2020/002816
§ 371 (c)(1),
(2) Date: Jan. 11, 2021

(87) PCT Pub. No.: WO2021/033860
PCT Pub. Date: Feb. 25, 2021

(65) Prior Publication Data
US 2021/0285756 A1    Sep. 16, 2021

(30) Foreign Application Priority Data

Aug. 16, 2019 (KR) .................. 10-2019-0100456

(51) Int. Cl.
*G01J 3/02*       (2006.01)
*G01B 11/06*      (2006.01)
*G01N 21/41*      (2006.01)
*G02B 27/28*      (2006.01)

(52) U.S. Cl.
CPC ............ *G01B 11/0625* (2013.01); *G01J 3/02* (2013.01); *G01N 21/41* (2013.01); *G02B 27/28* (2013.01)

(58) Field of Classification Search
CPC ........ G01B 11/0625; G01B 11/06; G01J 3/02; G01J 3/28; G01N 21/41; G02B 27/28
See application file for complete search history.

(56) References Cited

U.S. PATENT DOCUMENTS

2004/0042017 A1*  3/2004  Cohen .................... H01L 22/12
                                                    356/630

FOREIGN PATENT DOCUMENTS

| JP | 09196630    | 7/1997  |
|----|-------------|---------|
| JP | 2004177133  | 6/2004  |
| JP | 2005062188  | 3/2005  |
| KR | 20050075094 | 7/2005  |
| KR | 100631060   | 10/2006 |

(Continued)

*Primary Examiner* — Abdullahi Nur
(74) *Attorney, Agent, or Firm* — Allen, Dyer, Doppelt + Gilchrist, P.A.

(57) ABSTRACT

In the embodiment in association with the present disclosure, an apparatus and method for multilayer thin film thickness measurement using single-shot angle-resolved spectral reflectometry are provided which allow simultaneously obtaining the absolute reflectance and phase data of a measurement object over a broad wavelength range and wide incident angle according to various polarization states by a single-shot measurement.

7 Claims, 10 Drawing Sheets

(56) References Cited

FOREIGN PATENT DOCUMENTS

| KR | 1020080032680 | 4/2008 |
| KR | 100829204 | 5/2008 |
| KR | 1020080090225 | 10/2008 |
| KR | 100916618 | 9/2009 |
| KR | 101554205 | 9/2015 |
| KR | 101937043 | 1/2019 |
| KR | 20190034795 | 4/2019 |

* cited by examiner

APPARATUS AND METHOD FOR MULTILAYER THIN FILM THICKNESS MEASUREMENT USING SINGLE-SHOT ANGLE-RESOLVED SPECTRAL REFLECTOMETRY

CROSS-REFERENCE TO RELATED APPLICATIONS

This application is the U.S. National Phase of International Patent Application No. PCT/KR2020/002816, filed on 27 Feb. 2020, the contents of which are incorporated herein by reference in their entirety.

BACKGROUND

Technical Field

The present disclosure is related to an apparatus and method for multilayer thin film thickness measurement by using single-shot angle-resolved spectral reflectometry.

Related Art

An ellipsometer is widely used in analyzing the structure of multilayer films in the semiconductor industry, which is capable of measuring very important film parameters, such as the thickness and refractive index, which are usable as the quality inspection of films. However, due to the large size of a spot of 25 μm or greater, changes in the state of polarization reflected lights should be measured by consecutively changing low spatial resolution, incident angle and wavelength, thus causing the drawback that it takes long measurement times. Therefore, it is difficult to use the ellipsometer as a production inspection equipment in industrial settings.

Accordingly, in response to continuous industrial needs for high spatial resolution and high speed measurement, many studies have been made in the field of film measurement.

Among them, the beam profile reflectometer technique has been in the limelight as a promising candidate technique for satisfying these needs. The configuration of the co-axial optical system using a high NA objective lens provides submicron spatial resolution and measures polarized reflectance for various incident angles in real time. However, this method is limited to the monochromatic light. In order to obtain the polarized reflectance according to various wavelengths, the wavelength of the light source should be varied sequentially.

In order to measure both the wavelength of the light source and variations in the reflectance according to incident angles simultaneously, the angle-resolution spectral reflectometry was developed. However, it has the drawback to measure reflectance of only one polarization state according to the polarization state of the incident light and the direction of a line slit.

In order to overcome all the aforementioned technical limits, it is demanded to develop a new concept of measurement method capable of overcoming the drawbacks of the conventional angle-resolved spectral reflectometry. According to the embodiment of the present disclosure, the absolute reflectance and phase data of a measurement object over a broad wavelength range and wide incident angle according to various polarization states may be obtained simultaneously by a single-shot measurement.

SUMMARY

Technical Problem

Therefore, the present disclosure is provided to solve conventional problems as described in the above. In an embodiment of the present disclosure, an apparatus and method for multilayer thin film thickness measurement using single-shot angle-resolved spectral reflectometry are provided which allow simultaneously obtaining the absolute reflectance and phase data of a measurement object over a broad wavelength range and wide incident angle according to various polarization states by a single-shot measurement.

Further, in the embodiment in accordance with the present disclosure, an apparatus and method for multilayer thin film thickness measurement using single-shot angle-resolved spectral reflectometry are provided which allow measuring the thickness of a thin film corresponding to each layer of the multilayer thin film in real time as obtaining a single image simultaneously providing the changes in the phase and amplitude of p-polarized and s-polarized lights reflected from a measurement object.

Further, in yet another embodiment in accordance with the present disclosure, an apparatus and method for multilayer thin film thickness measurement using single-shot angle-resolved spectral reflectometry are provided which allow providing high spatial resolution and a relatively compact setup through the configuration of a co-axial optical system and being widely used as an in-line metrology tool particularly in the semiconductor industry in terms of high measurement speed, robustness to external noises and high spatial resolution.

Meanwhile, technical objects to be achieved in the present disclosure are not limited to the aforementioned technical objects, and other technical objects, which are not mentioned above, will be apparently understood to a person having ordinary skill in the art from the following description.

Technical Solution

According to a first aspect of the present disclosure, in an apparatus for measuring a thickness and a refractive index of a measurement object coated with a multilayer thin film, the apparatus for multilayer thin film thickness measurement using a single-shot angle-resolved spectra reflectometry may include: an illumination optical module which has a light source projecting light beams; a beam splitter which partially reflects the light beams projected from the illuminant optical module; an objective lens which allows the light beam reflected from the beam splitter to be incident on the measurement object of a multilayer thin film, then creating reflected light on a back focal plane; an imaging optical system on which the reflected light that was incident on the measurement object then reflected is allowed to be incident following passing through the beam splitter; a slit which transmits only a selected line of a reflectance pattern passed through the imaging optical system; an imaging spectrometer which converts a line signal of the reflected light passed through the slit into an angle-resolved spectral reflection pattern; a polarized camera which obtains and measures angle-resolved spectral reflectance images having discrete polarization states; and an analysis means which measures and analyzes a thickness of the measurement object from the angle-resolved spectral reflectance image having discrete polarization states.

According to another aspect of the present disclosure, the polarized camera may consist of a pixelated polarizer mask and a 2D sensor array.

According to another aspect of the present disclosure, the pixelated polarizer mask may consist of a repeated pattern array of a 2×2 unit cell over the entire mask, the 2×2 unit cell may be a micro polarizer pattern array having four discrete polarization axes, and the 2D sensor array may be aligned to each individual polarizer element of the micro polarizer pattern array, thus obtaining the angle-resolved spectral reflectance images having four discrete polarization states through the polarized camera.

According to another aspect of the present disclosure, the analysis means may obtain a reflectance of a first polarized reflectance image, a reflectance of a second reflectance image, and a phase difference of the first and second polarized reflectance images, on the basis of the angle-resolved spectral reflectance images having discrete polarization states, then measuring and analyzing a thickness of the measurement object, on the basis of the reflectance and the phase difference.

According to a second aspect of the present disclosure, in a method for measuring a thickness of a measurement object coated with a multilayer thin film, the method for multilayer thin film thickness measurement using a single-shot angle-resolved spectra reflectometry may include steps of: projecting light beams from a broad-spectrum light source of an illumination optical module; partially reflecting the light beams projected from the illuminant optical module in a beam splitter; creating reflected light on a back focal plane by allowing the light beam reflected from the beam splitter to be incident on the measurement object of a multilayer thin film, through an objective lens; allowing the reflected light that was incident on the measurement object then reflected to be incident following passing through the beam splitter; transmitting only a selected line of a reflectance pattern passed through the imaging optical system; converting a line signal of the reflected light passed through the slit into an angle-resolved spectral reflection pattern through an imaging spectrometer; obtaining and measuring angle-resolved spectral reflectance images having discrete polarization states through a polarized camera; and measuring and analyzing a thickness of the measurement object from the angle-resolved spectral reflectance images having discrete polarization states by an analysis means.

According to another aspect of the present disclosure, the polarized camera may consist of a pixelated polarizer mask and a 2D sensor array, the pixelated polarizer mask may consist of a repeated pattern array of a 2×2 unit cell over the entire mask, the 2×2 unit cell may be a micro polarizer pattern array having four discrete polarization axes, and the 2D sensor array may be aligned to each individual polarizer element of the micro polarizer pattern array, thus obtaining the angle-resolved spectral reflectance images having four discrete polarization states through the polarized camera in the obtaining and measuring step.

According to another aspect of the present disclosure, in the step of measuring and analyzing a thickness, the analysis means may obtain a reflectance of a first polarized reflectance image, a reflectance of a second polarized reflectance image, and a phase difference of the first and second polarized reflectance images, on the basis of the angle-resolved spectral reflectance images having discrete polarization states, then measuring and analyzing a thickness of the measurement object, on the basis of the reflectance and the phase difference.

Advantageous Effects

An apparatus and method for multilayer thin film thickness measurement using single-shot angle-resolved spectral reflectometry according to an embodiment of the present disclosure are capable of simultaneously obtaining the absolute reflectance and phase data of a measurement object over a broad wavelength range and wide incident angle according to various polarization states by a single-shot measurement.

Further, the apparatus and method for multilayer thin film thickness measurement using single-shot angle-resolved spectral reflectometry according to the embodiment of the present disclosure are capable of measuring the thickness of a thin film corresponding to each layer of a multilayer thin film in real time as obtaining a single image simultaneously providing the changes in the phase and amplitude of p-polarized and s-polarized lights reflected from a measurement object.

Further, the apparatus and method for multilayer thin film thickness measurement using single-shot angle-resolved spectral reflectometry according to the embodiment of the present disclosure are capable of providing high spatial resolution and a relatively compact setup through the configuration of a co-axial optical system and being widely used as an in-line metrology tool particularly in the semiconductor industry in terms of high measurement speed, robustness to external noises and high spatial resolution.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

FIGS. 2 to 7 show the basic principal of single-shot angle-resolved spectral reflectance measurement.

FIGS. 9 to 20 show comparisons of simulation results with measurement results.

REFERENCE NUMBERS

1: Measurement object
10: Illumination optical module
11: Light Source
12: Illumination optical system
20: beam splitter
30: Objective lens
31: Back focal plane
40: Imaging optical system
50: Slit
60: Imaging spectrometer
70: Polarized camera
71: Polarizer mask array
72: 2×2 unit cell
100: Apparatus for multilayer thin film thickness measurement using single-shot angle-resolved spectral reflectometry

DETAILED DESCRIPTION

Hereinafter, described are the configuration and function of an apparatus (100) for multilayer thin film thickness measurement using single-shot angle-resolved spectral reflectometry.

According to an embodiment of the present disclosure, adopted is a new concept of angle-resolved spectral reflectance measurement with a pixelated polarized camera (70) in order to measure a thickness of each layer of a multilayer thin film. It is allowed to measure the phase and amplitude of p-polarized and s-polarized lights over the broad spectrum range and a wide incident angle at a time.

According to the embodiment of the present disclosure, a measurement object of a multilayer thin film is measured, then comparing a measurement result with an ellipsometer so as to be verified. As described hereafter, this comparison data shows that a technique according to the embodiment of the present disclosure allows real-time inspection of multilayer thin films with high precision.

Figure 1:
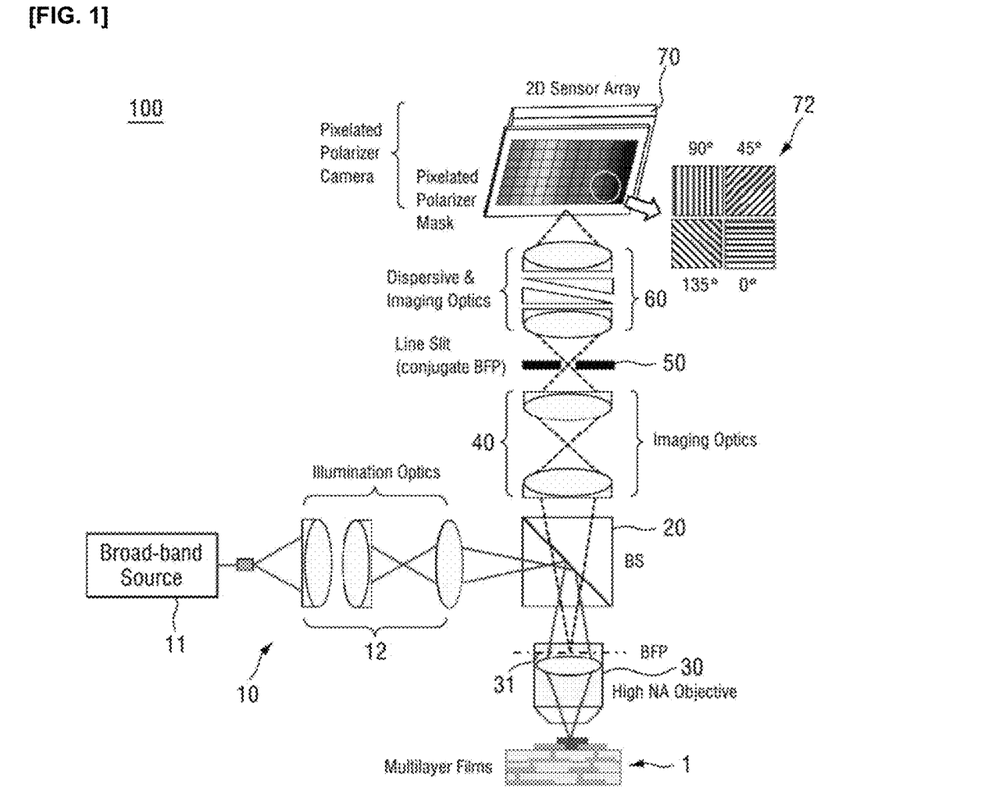
FIG. 1 is a diagram of an apparatus for multilayer thin film thickness measurement using angle-resolved spectral reflectometry according to the present disclosure.

FIG. 1 depicts a diagram of an apparatus (100) for multilayer thin film thickness measurement using angle-resolved spectral reflectometry according to the present disclosure. A shown in FIG. 1, the apparatus (100) for multilayer thickness measurement using single-shot angle-resolved spectral reflectometry may be, in general, configured to include an illumination optical module (10), a beam splitter (20), an objective lens (30), imaging optical system (40), a slit (50), an imaging spectrometer (60), a polarized camera (70), etc.

The illumination optical module (10) may be configured to include a broad-spectrum light source (11) and illumination optical system (12) which projects light beams projected from the broad-spectrum light source (11) so as to have uniform beam intensity distribution for the measurement object through the objective lens (30). As a particular embodiment of the present disclosure, the broad-spectrum light source (11) is configured to project light beams having a wavelength of 400 to 700 nm.

And the beam splitter (20) reflects the light beam projected in the illumination optical module (10), then allowing being incident on the objective lens (30).

A broad-spectrum light source (11) focuses the measurement object through a high numerical aperture (NA) objective lens (30). The focused light beam consists of many bundles of rays of which the incident angle ranges from $-\sin^{-1}(NA)°$ to $\sin^{-1}(NA)°$, and each of the rays is irradiated to a surface of the measurement object at an incident angle.

Therefore, the high NA objective lens (30) is applied in order to measure a wide range of reflectance according to the incident angle. The focused incident light undergoes multiple reflections and transmission within the measurement object, then creating reflected light having thin film thickness information on the back focal plane (BFP) (31) of the objective lens (30).

Further, as shown in FIG. 1, the light beam reflected in the beam splitter (20) is allowed being incident on the measurement object (1) of a multilayer thin film through the objective lens (30) followed by being reflected, then creating reflected light on the back focal plane (31).

This reflected light passes through the beam splitter (20), then allowed being incident on the imaging optical system (40). And the slit (50) is configured to transmit only a selected line of the reflected light passed through the imaging optical system (40).

The imaging spectrometer (60) converts a line signal of the reflected light passed through the slit (50) into an angle-resolved spectral reflection pattern.

The polarized camera (70) is configured to obtain and measure the angle-resolved spectral reflectance images having discrete polarization states. The analysis means measures and analyzes a thickness of the measurement object from these angle-resolved spectral reflectance images having discrete polarization states.

Description of Embodiments

Figure 2:
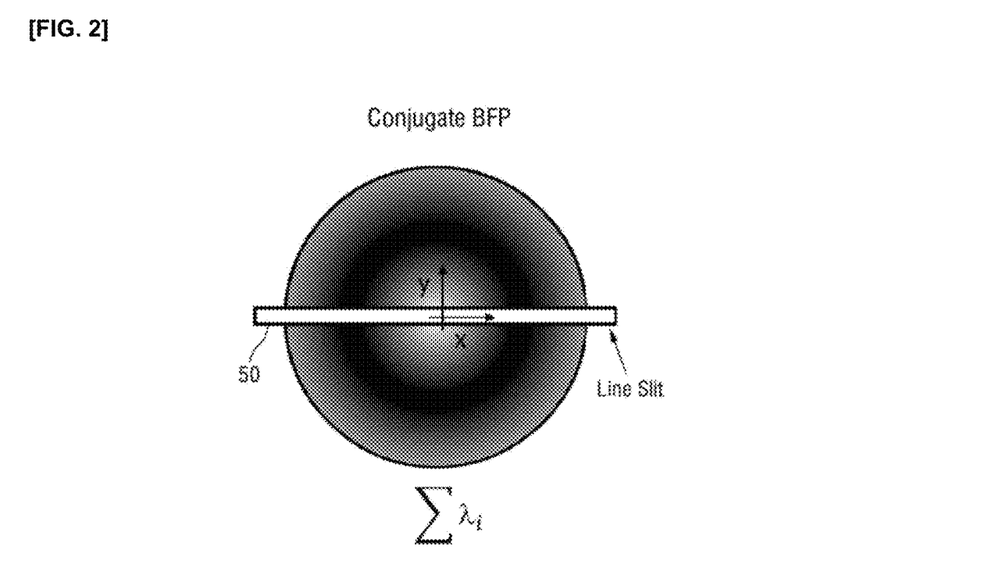
FIG. 2 shows a reflectance image of a back focal plane at the position of a line slit.
Figure 3:
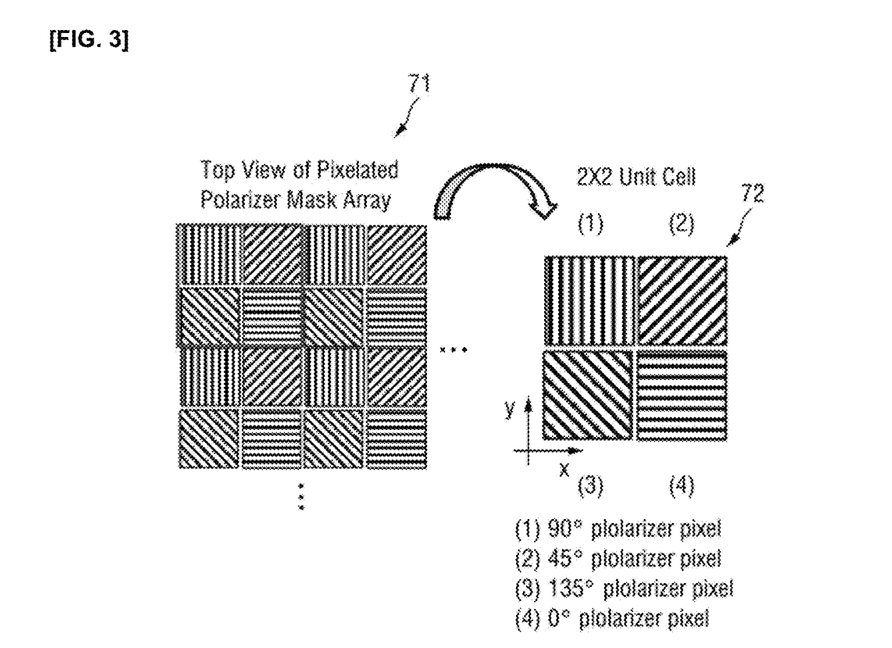
FIG. 3 shows a pixelated polarizer mask array and the unit cell structure thereof.

FIGS. 2 to 7 show the basic principal of single-shot angle-resolved spectral reflectance measurement. FIG. 2 shows a reflectance image of the back focal plane (31) at the position of a line slit (50). FIG. 3 shows a pixelated polarizer mask array (71) and the unit cell (72) structure thereof.

Figure 4:
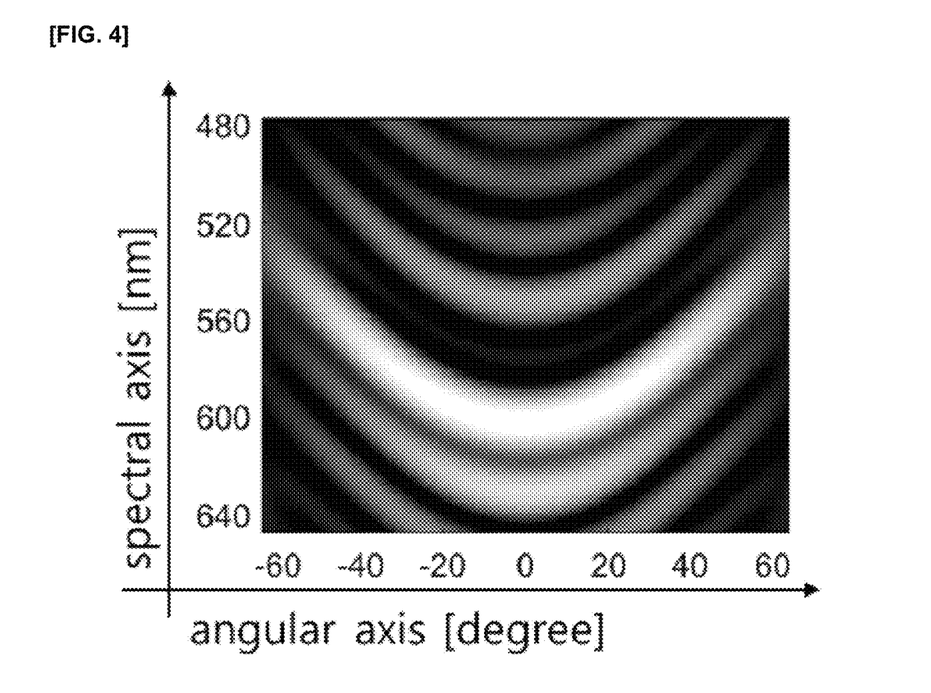
FIG. 4 shows p-polarized reflectance corresponding to a sub-array having 0° polarized pixels.
Figure 5:
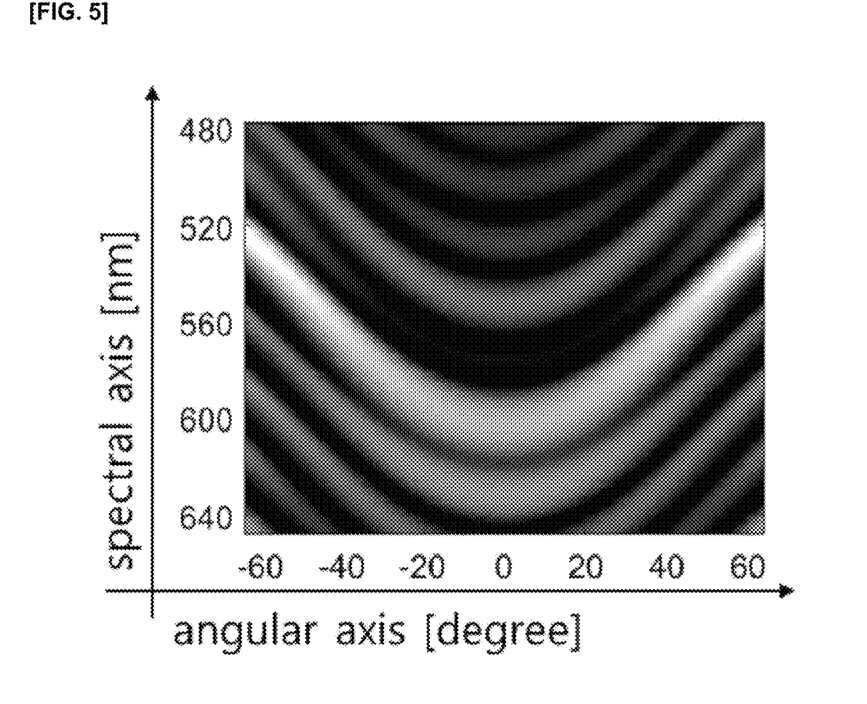
FIG. 5 shows p- and s-mixed polarized reflectance corresponding to a sub-array having 45° polarized pixels.
Figure 6:
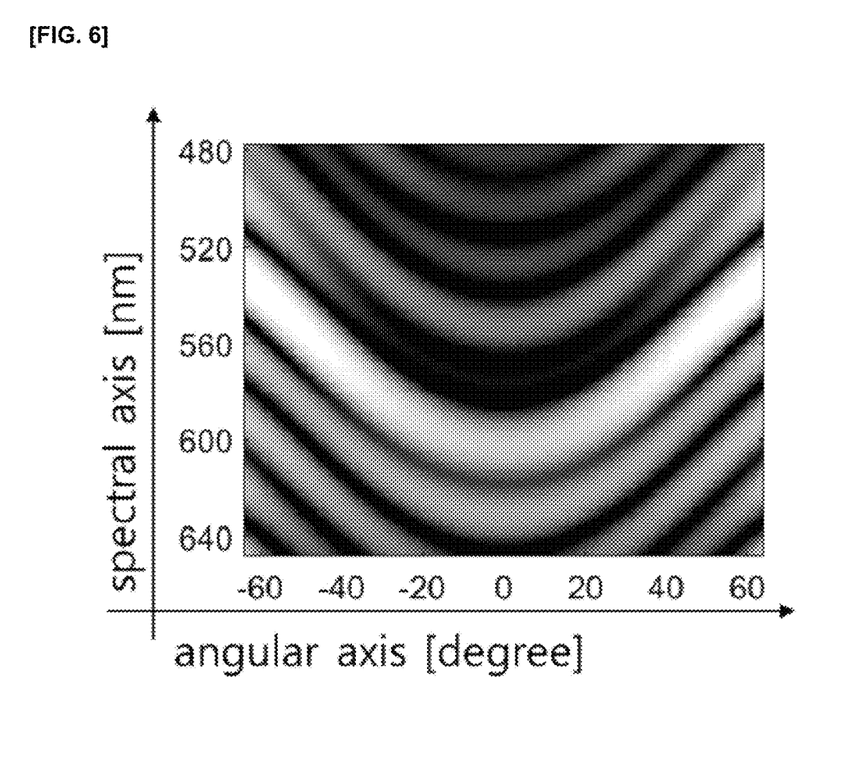
FIG. 6 shows s-polarized reflectance corresponding to a sub-array having 90° polarized pixels.
Figure 7:
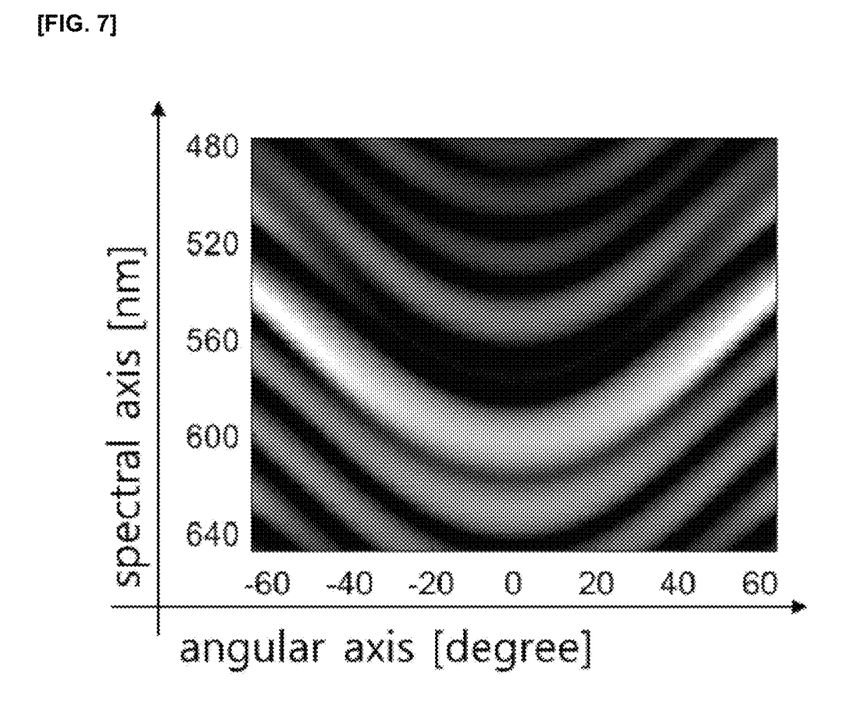
FIG. 7 shows P- and s-mixed polarized reflectance corresponding to a sub-array having 135° polarized pixels.
Figure 8:
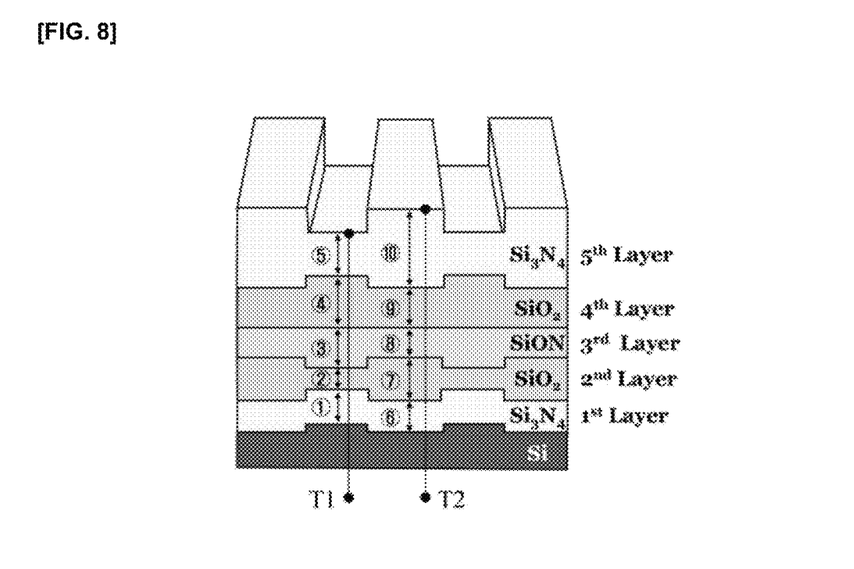
FIG. 8 shows a schematic view of a five-layer film structure in which $Si_3N_4$—$SiO_2$—$SiON$—$SiO_2$—$Si_3N_4$ are deposited on a wafer fabricated according to an experiment example of the present disclosure.

And FIG. 4 shows a p-polarized reflectance image corresponding to a sub-array having 0° polarized pixels. FIG. 5 shows a p- and s-mixed polarized reflectance image corresponding to a sub-array having 45° polarized pixels. FIG. 6 shows an s-polarized reflectance image corresponding to a sub-array having 90° polarized pixels. FIG. 7 shows a P- and s-mixed polarized reflectance image corresponding to a sub-array having 135° polarized pixels.

The imaging optical system (40) is used in transferring a reflectance pattern to the entry line slit (50), and the line slit (50) is configured to transmit only the selected line of the reflectance pattern as shown in FIG. 2.

And the passed line signal of the reflected light passes through the imaging spectrometer (60) (dispersive and imaging optical system), then being converted into an angle-resolved spectral reflection pattern.

And as shown in FIG. 3, in the embodiment of the present disclosure, the pixelated polarized camera (70) is adopted in order to obtain reflectance according to a broad wavelength range and wide incident angle in various polarization states. The pixelated polarized camera (70) consists of the pixelated polarizer mask array (71) and the 2D sensor array.

And, the pixelated polarizer mask array (71) consists of a repeated pattern array of a 2×2 unit cell (72) over the entire mask. This 2×2 unit cell (72) is a micro polarizer pattern array having four discrete polarization axes (0°, 45°, 90°, 135°). That is, the 2×2 unit cell (72) consists of 0° polarized pixels, 45° polarized pixels, 90° polarized pixels and 135° polarized pixels.

Since respective pixels of the 2D sensor array is aligned to each individual polarizer element of the micro polarizer pattern array (71), the reflectance patterns captured by the pixelated polarized camera (70) corresponding to four sub-arrays having discrete polarization states.

FIGS. 4 to 7 show the four angle-resolved spectral reflectance images having discrete polarization states according to a micro polarizer angle. The respective sub-arrays having 0°, 45°, 90° and 135° polarizers correspond to p-polarized, p- and s-mixed polarized, s-polarized and p- and s-mixed polarized reflectance images, respectively.

Therefore, various polarized reflectance data over a wide spectral and angular region may be obtained by a single-shot measurement. The obtained angle-resolved spectral reflectance obtained by the pixelated polarized camera (70) may be represented by formula 1 as below.

$$I^{sam}(d; \theta, \lambda, \phi) = \quad \text{[Formula 1]}$$

$$I_0(\theta, \lambda, \phi)\left[\mathfrak{R}_p^{sam}(d; \theta, \lambda)\cos^2(\phi) + \mathfrak{R}_s^{sam}(d; \theta, \lambda)\sin^2(\phi) + \sqrt{\mathfrak{R}_p^{sam}(d; \theta, \lambda)\mathfrak{R}_s^{sam}(d; \theta, \lambda)}\sin(2\phi)\sin(\Delta^{sam})\right]$$

In formula 1, θ is an incident angle, λ is a wavelength, Φ is a micro-polarizer angle, d is a thickness of a multilayer thin film. $I_0$ is a beam intensity for a reference surface, $R_p$ is reflectance of p-polarized light, $R_s$ is reflectance of s-polarized light, Δ is a phase difference induced by reflection between p- and s-polarized light.

On the basis of formula 1, $R^{sam}_p$, $R^{sam}_s$, and $\sin(\Delta^{sam})$ may be induced by the following formula 2, formula 3, and formula 4, respectively.

$$\mathfrak{R}_p^{sam} = \frac{I^{sam}(0°)}{I^{ref}(0°)} \times \mathfrak{R}_p^{ref} \quad \text{[Formula 2]}$$

$$\mathfrak{R}_s^{sam} = \frac{I^{sam}(90°)}{I^{ref}(90°)} \times \mathfrak{R}_s^{ref} \quad \text{[Formula 3]}$$

$$\sin(\Delta^{sam}) = \frac{A}{2\sqrt{\mathfrak{R}_p^{sam}\mathfrak{R}_s^{sam}}} \quad \text{[Formula 4]}$$

$$A = \left[\frac{I^{sam}(45°)}{I^{ref}(45°)} \times \left(0.5\mathfrak{R}_p^{ref} + 0.5\mathfrak{R}_s^{ref} + \sqrt{\mathfrak{R}_p^{ref}\mathfrak{R}_s^{ref}}\sin(\Delta^{ref})\right) - \frac{I^{sam}(135°)}{I^{ref}(135°)} \times \left(0.5\mathfrak{R}_p^{ref} + 0.5\mathfrak{R}_s^{ref} + \sqrt{\mathfrak{R}_p^{ref}\mathfrak{R}_s^{ref}}\sin(\Delta^{ref})\right)\right]$$

For simplifying equations, symbols, such as d, θ, and λ were omitted.

According to the present disclosure, the measurement object of a multilayer thin film was measured, then comparing a measurement result with ellipsometer so as to be verified. This comparison data shows that the technique according to the embodiment of the present disclosure allows real-time inspection of multilayer thin films with high precision.

$I^{sam}(\Phi)$ and $I^{ref}(\Phi)$ represent the reflectance intensity of the measurement object and the reference specimen at 0°, 45°, 90°, 135°, respectively. At this time, silicon wafer was used as the reference specimen, and optical constants for the silicone material are well known, thus allowing theoretically calculating $R^{ref}_p$, $R^{sam}_s$, and $\sin(\Delta^{ref})$. $R_p$, $R_s$, and $\sin(\Delta)$ for the measurement object are obtained through formulas 2 to 4, then allowing obtaining a thickness of each layer of the multilayer film by minimizing the sum of the least squares of error function over a wide range of wavelengths and incident angles as the following formula 5.

$$\zeta(d_1 \cdots d_n; \theta, \lambda) = \quad \text{[Formula 5]}$$

$$\sum_{i=1}^{i}\sum_{j=1}^{k}\left[\alpha|\mathfrak{R}_p^E(\theta_i, \lambda_j) - \mathfrak{R}_p^T(d_1 \cdots d_n; \theta_i, \lambda_j)|^2 + \beta|\mathfrak{R}_s^E(\theta_i, \lambda_j) - \mathfrak{R}_s^T(d_1 \cdots d_n; \theta_i, \lambda_j)|^2 + \gamma|\sin\Delta^E(\theta_i, \lambda_j) - \sin\Delta^T(d_1 \cdots d_n; \theta_i, \lambda_j)|^2\right]$$

in the formula 5, superscripts, 'E' and 'T' represent 'Experiment' and 'Theory', respectively. α, β, and γ represent a weight which adjusts the effectiveness ratio of each parameter used in the error function. These values may be adjusted in order to increase the convergence speed of the formula 5 and the accuracy of the film thickness.

In order to verify a method according to the embodiment of the present disclosure, the multilayer film was fabricated, which was patterned by a photo lithography having the internal structure as shown in FIG. 3. As shown in FIG. 3, three types of films having various thicknesses where $Si_3N_4$—$SiO_2$—$SiON$—$SiO_2$—$Si_3N_4$ were deposited are stacked on the patterned silicon wafer sequentially, then selecting two different positions, $T_1$ and $T_2$ followed by comparing measurement results according to the embodiment of the present disclosure.

Table 1 shows details of our optical system used in the experiment example. Four angle-resolved reflectance images corresponding to the respective sub-arrays of the pixelated polarized camera (70) are a measured, then allowing obtaining an angle-resolved spectral image of p-polarized reflectance, an angle-resolved spectral image of s-polarized reflectance and a sine value of the phase difference between p- and s-polarization by the aforementioned formulas 2 to 4.

TABLE 1

| Item | Specification |
|---|---|
| Microscope objective | 100 magnification with 0.9 N.A. |
| Wavelength to be used | 477 nm to 648 nm |
| Incident angle to be used | −64° to 64° |
| Lateral resolution (Spot Size) | 0.32 μm |

FIGS. 9 to 20 show comparisons of measurement results and simulation results of the experiment of $R_p$, $R_s$, and sin Δ for a five-layer film, respectively. That is, FIGS. 9 to 20 show comparisons of simulation results and measurement results.

Figure 9:
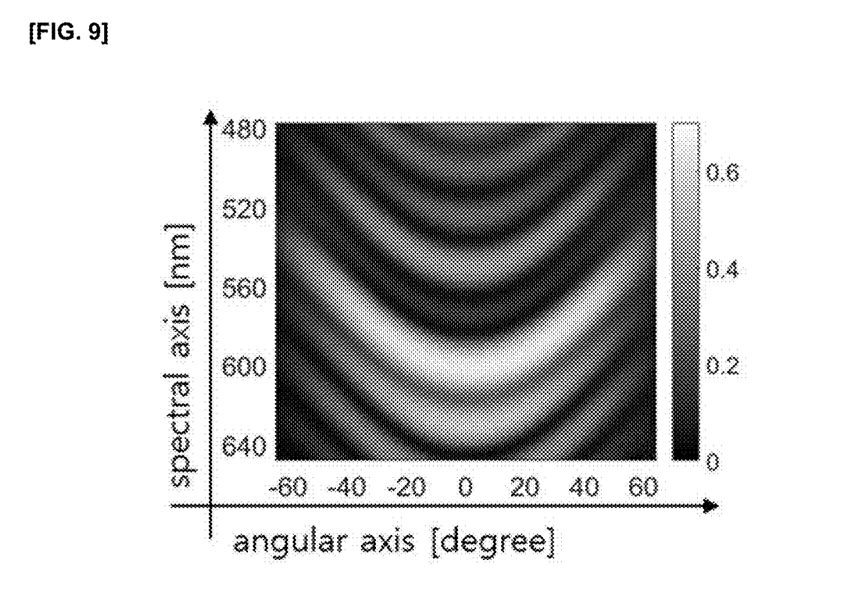
FIG. 9 and FIG. 10 are measured and simulated angle-resolved spectral reflectance images of p-polarized reflectance, respectively.
Figure 10:
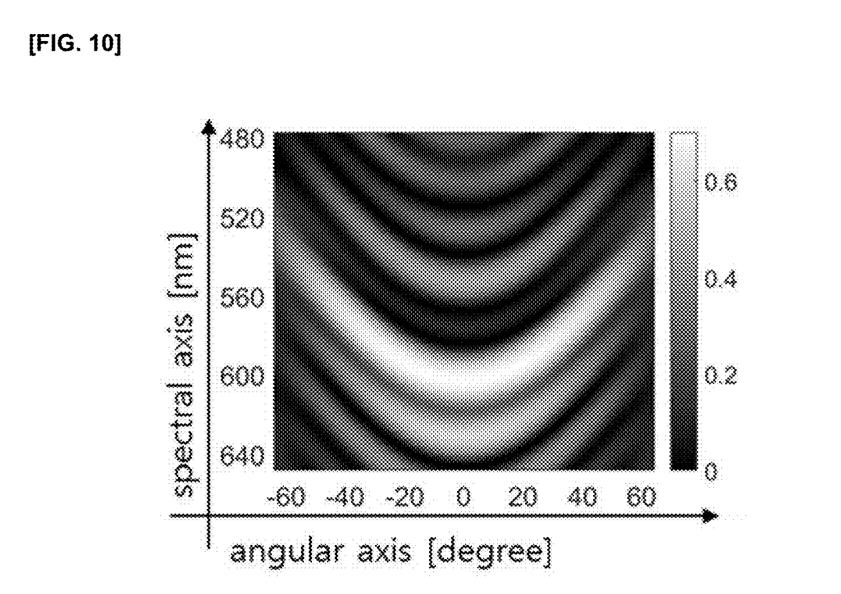
Figure 11:
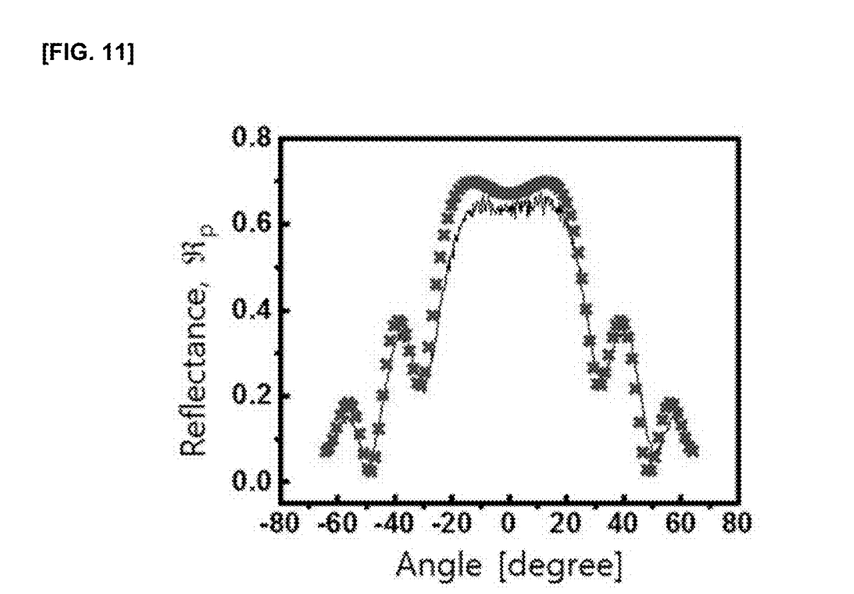
FIG. 11 shows a comparison graph of reflectance of p-polarized simulation (red colored 'x' mark) with measured p-polarization (black colored solid line) according to an incident angle at a wavelength of 587.6 nm.
Figure 12:
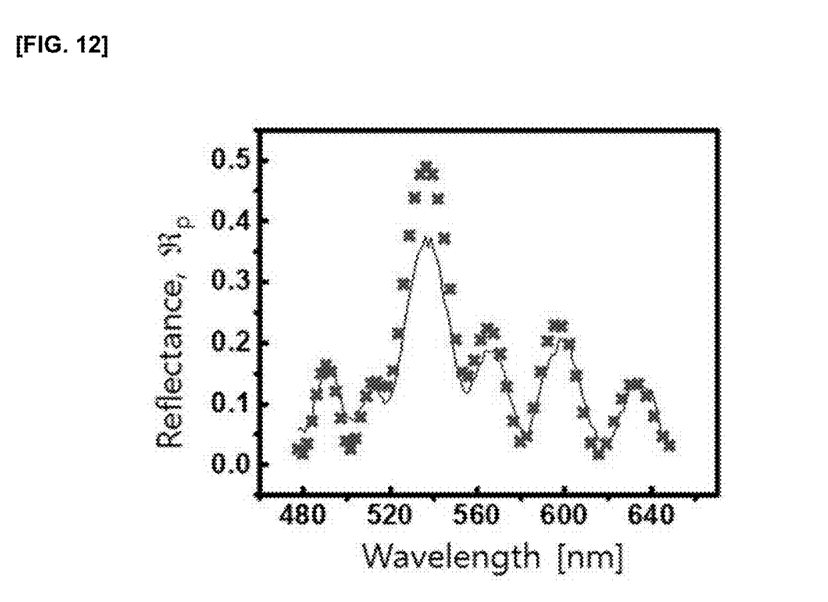
FIG. 12 shows a comparison graph of reflectance of p-polarized simulation (red colored 'x' mark) with measured p-polarization (black colored solid line) according to a wavelength at an incident angle of 52.4°.

FIG. 9 and FIG. 10 are measured and simulated angle-resolved spectral reflectance images of p-polarized reflectance, respectively. FIG. 11 FIG. 11 shows a comparison graph of reflectance of p-polarized simulation (red colored 'x' mark) with measured p-polarization (black colored solid line) according to an incident angle at a wavelength of 587.6 nm. And FIG. 12 shows a comparison graph of reflectance of p-polarized simulation (red colored 'x' mark) with measured p-polarization (black colored solid line) according to a wavelength at an incident angle of 52.4°.

Figure 13:
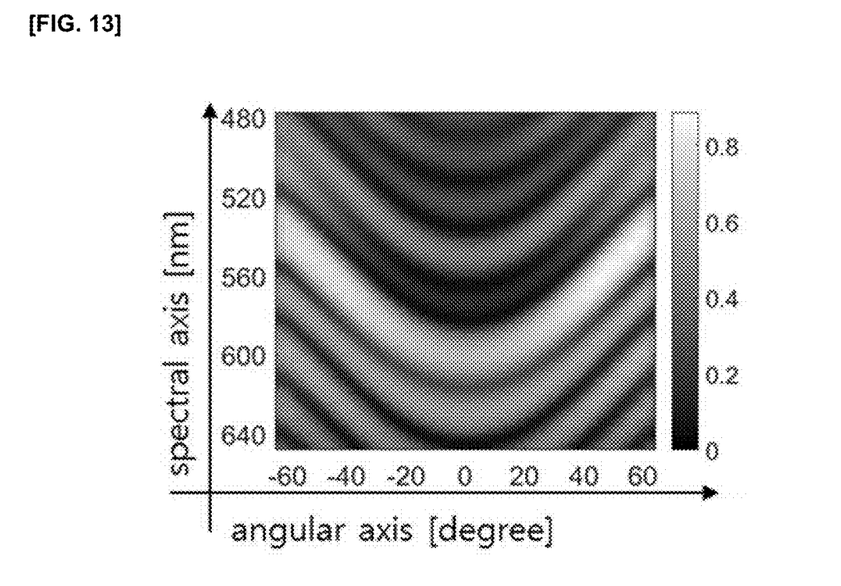
FIGS. 13 and 14 are measured and simulated angle-resolved spectral reflectance images of s-polarized reflectance, respectively.
Figure 14:
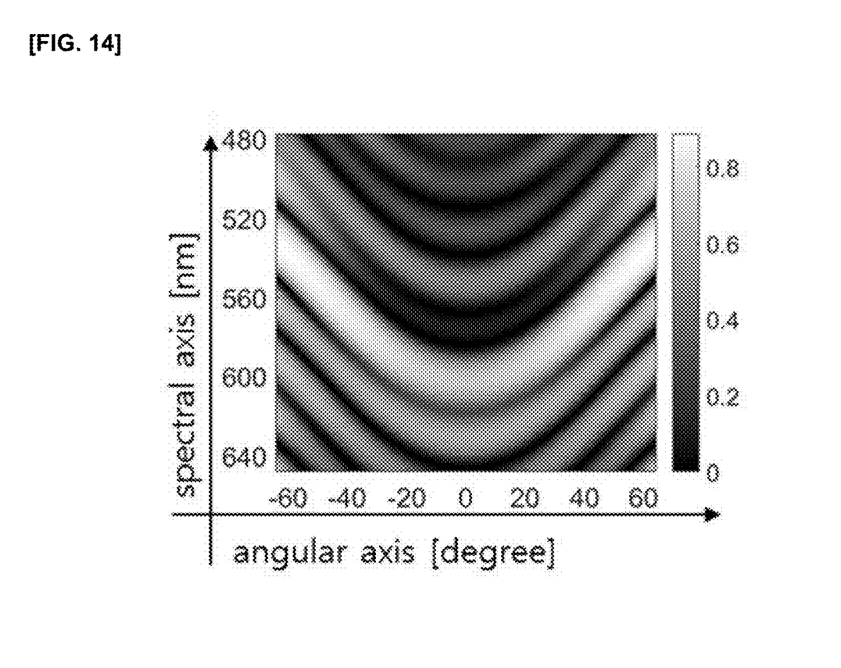
Figure 15:
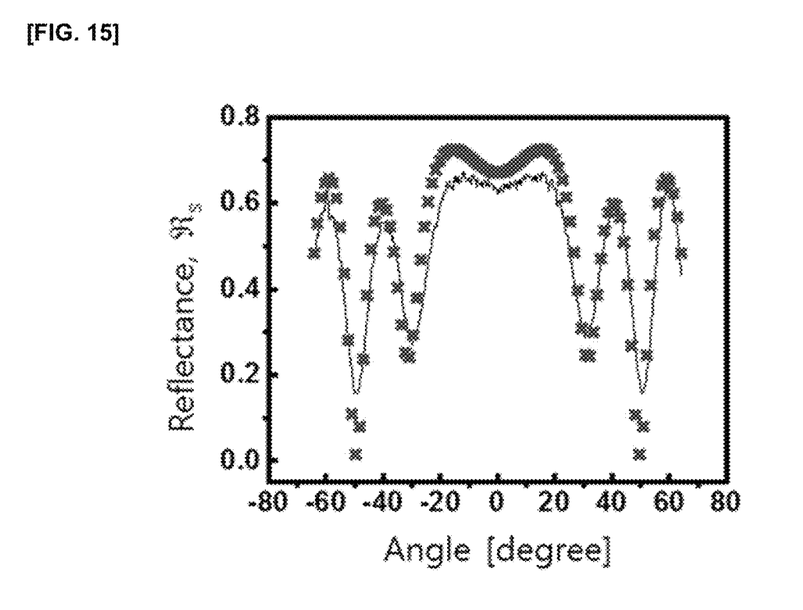
FIG. 15 shows a comparison graph of reflectance of s-polarization simulation (red colored 'x' mark) with measured s-polarization (black colored solid line) according to an incident angle of at a wavelength of 587.6 nm.
Figure 16:
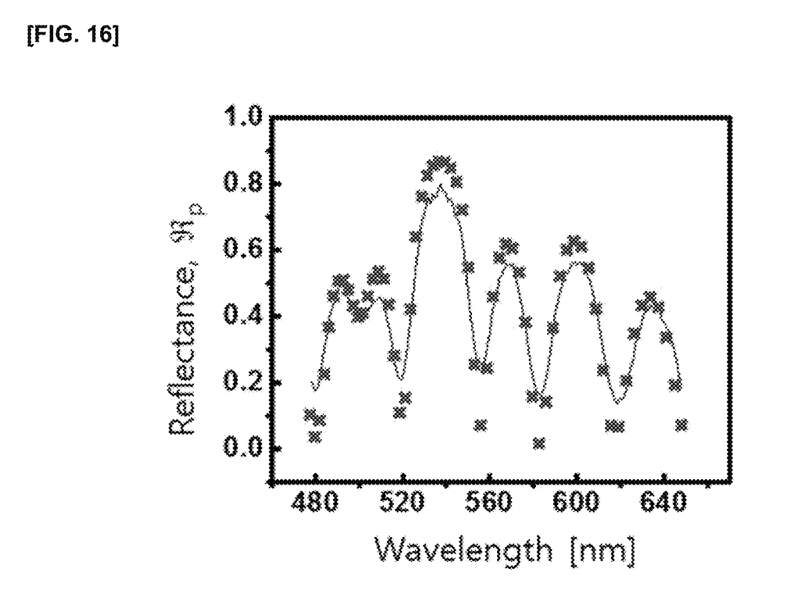
FIG. 16 shows a comparison graph of reflectance of s-polarization simulation (red colored 'x' mark) with measured s-polarization (black colored solid line) according to a wavelength at an incident angle of 52.4°.

FIGS. 13 and 14 are measured and simulated angle-resolved spectral reflectance images of s-polarization reflectance, respectively. FIG. 15 shows a comparison graph of reflectance of s-polarization simulation (red colored 'x' mark) with measured s-polarization (black colored solid line) according to an incident angle of at a wavelength of 587.6 nm. FIG. 16 shows a comparison graph of reflectance of s-polarization simulation (red colored 'x' mark) with measured s-polarization (black colored solid line) according to a wavelength at an incident angle of 52.4°.

Figure 17:
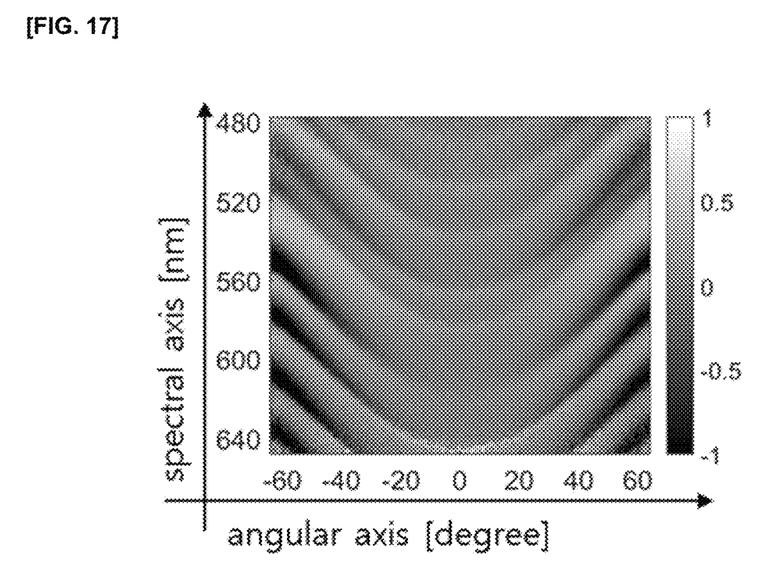
FIGS. 17 and 18 are measured and simulated angle-resolved spectral reflectance images of the phase difference between p-polarization and s-polarization.
Figure 18:
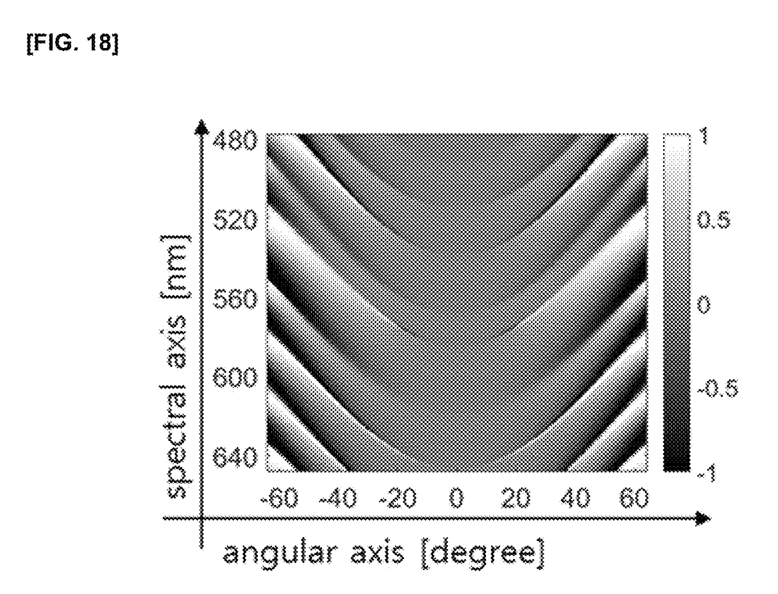
Figure 19:
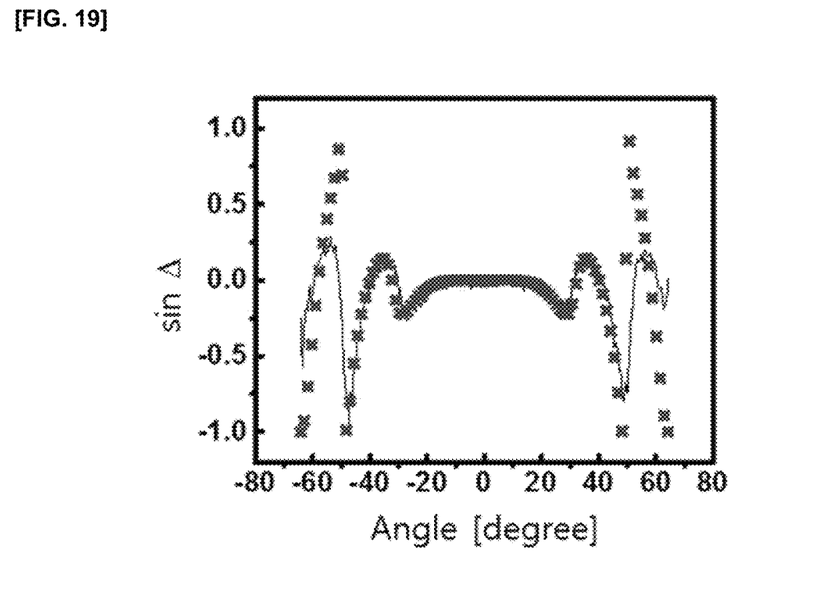
FIG. 19 shows a comparison graph of phase difference sin Δ of simulation (red colored 'x' mark) with measured phase difference (black colored solid line) according to an incident angle at a wavelength of 587.6 nm.
Figure 20:
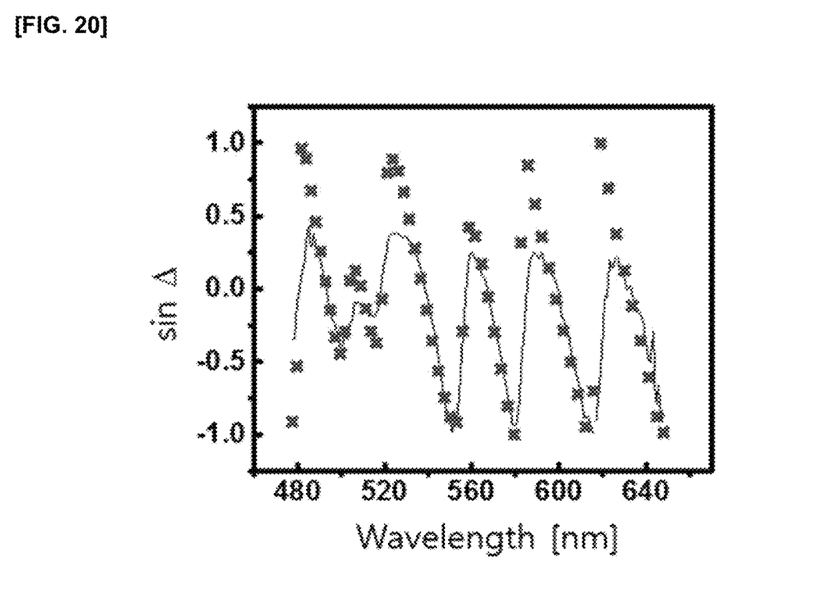
FIG. 20. a comparison graph of phase difference sin Δ of simulation (red colored 'x' mark) with measured phase difference (black colored solid line) according to a wavelength at an incident angle of 52.4°.

FIGS. 17 and 18 are measured and simulated angle-resolved spectral reflectance images of the phase difference between p-polarization and s-polarization. FIG. 19 shows a comparison graph of phase difference sin Δ of simulation (red colored 'x' mark) with measured phase difference (black colored solid line) according to an incident angle at a wavelength of 587.6 nm. FIG. 20. a comparison graph of phase difference sin Δ of simulation (red colored 'x' mark) with measured phase difference (black colored solid line) according to a wavelength at an incident angle of 52.4°

The optimal set of the thickness (d1, d2, d3, d4 and d5) of each layer of the measurement object are numerically determined at two different positions $T_1$ and $T_2$ by minimizing an objective function using a global optimization technique. Weight factors, α, β and γ are adjusted to contribute the objective function equally.

Each theoretical model (simulation) for $R_p$, $R_s$ and sin $\Delta_s$ agrees with the measurement data according to the embodiment of the present disclosure. Table 2 shows comparisons of the measurement result according to the embodiment of the present disclosure with a commercial device, the KLA-Tencor SpectraFx 100 ellipsometer. The thickness deviation of each layer between the two methods is less than ~13 nm, showing good agreement with each other.

TABLE 2

| Sampling Position | | Ellipsometer | Our method |
|---|---|---|---|
| Si₃N₄ Layer (1ˢᵗ Layer) | T1 ① | 300.2 nm | 294.9 nm |
| | T2 ⑥ | 300.1 nm | 299.7 nm |
| SiO₂ Layer (2ⁿᵈ Layer) | T1 ② | 338.6 nm | 337.4 nm |
| | T2 ⑦ | 544.2 nm | 544.6 nm |
| SiON Layer (3ʳᵈ Layer) | T1 ③ | 461.4 nm | 450.1 nm |
| | T2 ⑧ | 366.3 nm | 353.7 nm |
| SiO₂ Layer (4ᵗʰ Layer) | T1 ④ | 724.1 nm | 725.3 nm |
| | T2 ⑨ | 518.1 nm | 519.6 nm |
| Si₃N₄ Layer (5ᵗʰ Layer) | T1 ⑤ | 670.3 nm | 663.0 nm |
| | T2 ⑩ | 1347.4 nm | 1348.8 nm |

As shown in the aforementioned comparison data, the new method of single-shot angle-resolved spectra reflectometry was verified by comparing the measurement result according to the embodiment of the present disclosure with ellipsometer. This shows equivalent performance to the conventional method.

According to the embodiment of the present disclosure, obtained is a single image simultaneously providing the changes in the phase and amplitude of p-polarized and s-polarized lights reflected from the measurement object. Thus, it is capable of measuring the thin film thickness corresponding to each layer of the multilayer thin film in real time. Further, the configuration of the co-axial optical system according to the present disclosure is capable of providing high spatial resolution and a relatively compact setup.

That which is claimed is:

1. In an apparatus for measuring a thickness and a refractive index of a measurement object coated with a multilayer thin film, the apparatus for multilayer thin film thickness measurement using a single-shot angle-resolved spectral reflectometry comprises:

an illumination optical module which has a light source projecting light beams;

a beam splitter which partially reflects the light beams projected from the illuminant optical module;

an objective lens which allows the light beam reflected from the beam splitter to be incident on the measurement object of a multilayer thin film, then creating reflected light on a back focal plane;

imaging optical system on which the reflected light that was incident on the measurement object then reflected is allowed to be incident following passing through the beam splitter;

a slit which transmits only a selected line of a reflectance pattern passed through the imaging optical system;

an imaging spectrometer which converts a line signal of the reflected light passed through the slit into an angle-resolved spectral reflection pattern;

a polarized camera which obtains and measures angle-resolved spectral reflectance images having discrete polarization states; and an analysis means which measures and analyzes a thickness of the measurement object from the angle-resolved spectral reflectance images having discrete polarization states.

2. The apparatus of claim 1, characterized in that the polarized camera consists of a pixelated polarizer mask and a 2D sensor array.

3. The apparatus of claim 2, characterized in that the pixelated polarizer mask consists of a repeated pattern array of a 2×2 unit cell over the entire mask, the 2×2 unit cell is a micro polarizer pattern array having four discrete polarization axes, and the 2D sensor array is aligned to each individual polarizer element of the micro polarizer pattern array, thus obtaining the angle-resolved spectral reflectance images having four discrete polarization states through the polarized camera.

4. The apparatus of claim 3, characterized in that the analysis means obtains a reflectance of a first polarized reflectance image, a reflectance of a second polarized reflectance image, and a phase difference of the first and second polarized reflectance images, on the basis of the angle-resolved spectral reflectance images having discrete polarization states, then measuring and analyzing a thickness of the measurement object, on the basis of the reflectance and the phase difference.

5. In a method for measuring a thickness of a measurement object coated with a multilayer thin film, the method for multilayer thin film thickness measurement using a single-shot angle-resolved spectral reflectometry comprises steps of:

projecting light beams from a broad-spectrum light source of an illumination optical module;

partially reflecting the light beams projected from the illuminant optical module in a beam splitter;

creating reflected light on a back focal plane by allowing the light beam reflected from the beam splitter to be incident on the measurement object of a multilayer thin film, through an objective lens;

allowing the reflected light that was incident on the measurement object then reflected to be incident following passing through the beam splitter;

transmitting only a selected line of the reflectance pattern passed through the imaging optical system;

converting a line signal of the reflected light passed through the slit into an angle-resolved spectral reflection pattern through an imaging spectrometer;

obtaining and measuring angle-resolved spectral reflectance images having discrete polarization states through a polarized camera; and measuring and analyzing a thickness of the measurement object from the angle-resolved spectral reflectance images having discrete polarization states by an analysis means.

6. The method of claim 5, characterized in that the polarized camera consists of a pixelated polarizer mask and a 2D sensor array, the pixelated polarizer mask consists of a repeated pattern array of a 2×2 unit cell over the entire mask, the 2×2 unit cell is a micro polarizer pattern array having four discrete polarization axes, and the 2D sensor array is aligned to each individual polarizer element of the micro polarizer pattern array, thus obtaining the angle-resolved spectral reflectance images having four discrete polarization states through the polarized camera in the obtaining and measuring step.

7. The method of claim 6, characterized in that, in the step of measuring and analyzing a thickness, the analysis means obtains a reflectance of a first polarized reflectance image, a reflectance of a second polarized reflectance image, and a phase difference of the first and second polarized reflectance images, on the basis of the angle-resolved spectral reflectance images having discrete polarization states, then measuring and analyzing a thickness of the measurement object, on the basis of the reflectance and the phase difference.

* * * * *